UNITED STATES PATENT OFFICE.

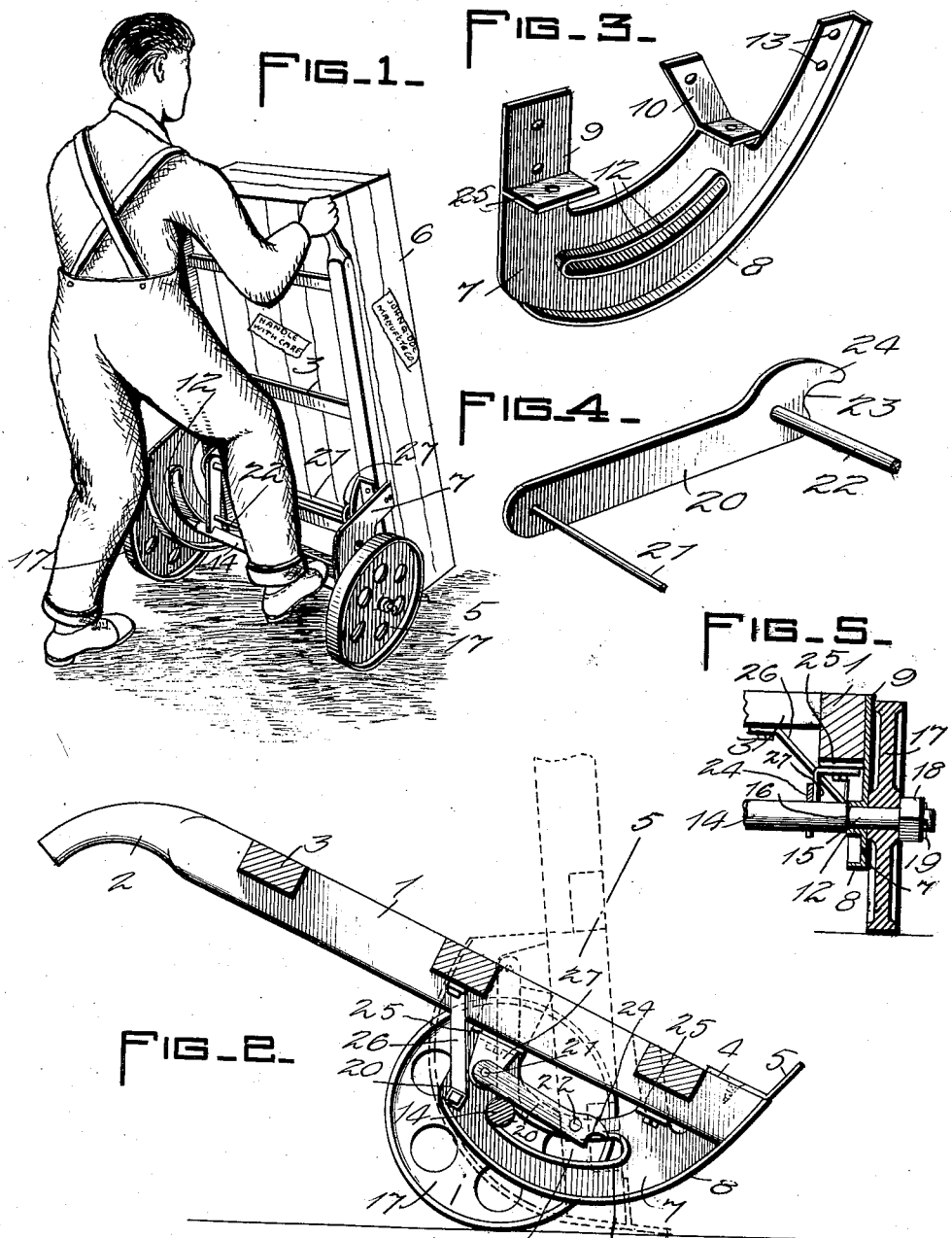

JAMES T. HALL, OF WACO, TEXAS.

TRUCK.

1,201,957. Specification of Letters Patent. Patented Oct. 17, 1916.

Application filed March 2, 1916. Serial No. 81,657.

*To all whom it may concern:*

Be it known that I, JAMES T. HALL, a citizen of the United States, and a resident of Waco, in the county of McLennan and State of Texas, have invented certain new and useful Improvements in Trucks, of which the following is a specification.

An object of my invention contemplates the provision of an improved hand operated truck adapted for handling express matter, baggage and the like, wherein the truck body is so mounted with respect to the supporting wheels as to be movable transversely of the axis of rotation of said wheels, whereby the body may initially take such position as to readily have the package placed against it, and may subsequently be so arranged with respect to the supporting wheels as to permit the article or package to be easily and smoothly lifted and to be poised in such position above the wheels as to relieve the operator of the strain of supporting a greater or lesser part of the weight, a disadvantage incident to many types of trucks.

A further object of the invention is to provide an improved truck in which the body is equipped with bracket plates or rockers having registering guides or grooves in which the axle is slidably supported, the construction being such that the truck body may readily engage beneath the bundle or package to be lifted, and as the truck is operated backwardly the weight will initially rest upon the rockers until a convenient angle is obtained at which time it will be transferred to the axle, which will have moved backwardly in the guide-ways into such position as to support the weight in an approximately balanced position above the axle, so that only slight exertion on the part of the operator in moving and shifting the truck about will be necessary.

Still another object of the invention contemplates the provision of a truck in which the axle is carried in rockers or bracket plates and is adapted to be shifted from end to end of guide-ways provided in the plates, the truck having latching means for locking the axle in one position relatively to the bracket plates or rockers and the body of the truck.

In the drawings:—Figure 1 represents a perspective view showing the truck in operation; Fig. 2 represents a longitudinal vertical section; Fig. 3 represents a perspective view of one of the guides; Fig. 4 represents a similar view of one end of the locking or latching device, and Fig. 5 represents a section on the line 5—5 of Fig. 2.

The present embodiment of the invention includes a truck body having the usual side bars 1, formed at one end each with a handle 2, and connected at intervals by the cross bars 3. At the ends remote from the handles, the side bars 1 are connected by an angle plate consisting of a portion 4 extending transversely of the side bars and secured thereto in any suitable manner, and a portion 5 extending at an obtuse angle from the portion 4 and upwardly and laterally with respect to a plane through the body of the truck.

The angle plate comprises the usual toe with which trucks of this nature are equipped for engaging beneath the packages or articles to be handled.

The portion 5 of the angle plate or toe is designed to engage beneath the package indicated at 6 to be loaded, and beneath the lower edge thereof as shown in Fig. 1, and as indicated in dotted lines in Fig. 2.

In a truck of ordinary construction, after the toe has been engaged beneath the package, the latter is tilted against the truck body and the body is then tilted on the axle to lift the package from the floor or platform to permit transportation thereof. In the truck as ordinarily constructed, however, it is difficult to insert the toe beneath the package, that is, it is difficult to so mount the body relatively to the axle that this portion can be inserted with facility beneath the package. In order that the toe, corresponding to the portion 5, may readily engage beneath the package or article to be lifted with the truck body in approximately vertical position, it is necessary that the height of the axle from the floor or platform or other surface on which the truck is supported, be approximately the same as the distance from the axle to the lower end of the truck, being in fact a trifle less than the said last named distance.

Unless the truck body is in approximately vertical position, some effort is required to overturn the article against the truck body, and as a consequence there is an unpleasant jar when the article strikes the truck body. Unless the distance from the axle to the lower end of the truck is greater than the distance from the axle to the supporting surface for the truck, it is obvious that the toe could not be inserted beneath the article, and if the distance is too great the truck body will be so greatly inclined that it will be difficult to lower the article onto the truck body.

When the relative distance of the axle from the end of the truck is not as it should be, the weight of the article will not be properly balanced upon the truck, and the latter will not only be difficult to manipulate but will place upon the operator the strain of supporting to a greater or less extent the weight of the article and of the truck body.

My present invention contemplates eliminating these difficulties and disadvantages, by making the truck body movable transversely of the axle in such manner that the initial loading of the article onto the truck body is facilitated, and the subsequent manipulation of the truck in transporting the article is rendered free of difficulty and strain upon the operator by balancing the article and the weight of the truck body upon the axle. In obtaining this result, a pair of bracket plates or rockers is provided, which includes each a body 7, having one side edge curved and flanged or ribbed laterally, as indicated at 8. The plate is also provided with perforated lugs 9 and 10, for permitting the same to be attached to the truck body. The plate is further provided with an arc-shaped slot or passage 11 of a curvature relatively coincident with the curvature of the side edge of the plate, and with a continuous flange or rib 12, encircling the slot or passage and extending in the same direction as the rib 8 before mentioned.

The lug 9, which has its rearward edge flush with the adjacent end of the plate, the lug 10, and the opposite end of the plate are co-planar and have their free ends arranged in the same line. Said opposite end of the plate is provided with a plurality of openings 13. The rockers or bracket plates are arranged as shown in Fig. 2, with the ribs 8 and 12 extending inwardly and with the lugs 9 and 10 and with the perforated end of the plate lapping on the outer faces of the side bars of the truck body.

Bolts, rivets, or other suitable fastening means are passed through openings provided in the lugs 9 and 10, and through the openings 13, and engaging through registering openings provided in the side bars, connect the guide plates securely thereto. The guide plates or rockers are provided on their inner faces adjacent to the lugs 9 and 10 with inwardly extending shoulders or lugs 25, which fit under the lower surface of the side bars 1 and are suitably secured thereto by bolts, screws or other similar fastening means. In order that these rockers or bracket plates may be held against springing or spreading by the weight placed upon the truck, braces 26 are provided. These braces at their inner ends are connected with one of the cross bars 3 of the truck body, and at their outer ends are bolted or riveted to the rocker plates at suitable points.

The rib 8 adjacent the forward end of the plate fits against the front end of the adjacent side bar as indicated in Fig. 2, and this rib is continuous from the under face of the portion 5 of the plate or toe 4—5 to the rear end of the rocker plate 7. The axle 14 has its ends reduced as indicated at 15, and an annular shoulder 16 is formed between the body of the axle at each end and the adjacent reduced portion or spindle 15. These spindles 15 are of a diameter to smoothly and snugly fit within the arc-shaped slots or passages 11, and the shoulders 16 gently abut against the free edges of the ribs 12. The wheels 17 of the truck are mounted on the spindles outside of the rocker plates 7, and are retained in place through the medium of nuts 18 threaded one onto each spindle outside of the adjacent wheel, and held against loss by a cotter pin 19, passing through an opening in the spindle outside of the nut. The slots or passages 11 are in register transversely of the truck body, and consequently the axle may slide from end to end of the said slots or passages.

In order that the axle may be locked at the lower or forward ends of the guide slots 11, a latch mechanism is provided. This mechanism includes a pair of plates 20, connected by parallel rods 21 and 22. The rod 21 at its ends extends beyond the plates 20, and is pivotally supported in brackets 27, depending from the body of the truck. These brackets, as indicated in Fig. 5, are angular in form and they may be retained in place by the same fastening means which extend through the rearmost of the shoulders or lugs 25.

The latch plates 20 are provided at their forward ends, or those ends remote from the rod 21, each with a notch or recess 23, opening at the lower side of the plate, and defining a curved overhanging finger or lug 24 at the upper side of the plate.

When the axle is at the forward ends of the guide slots 11, the latches may drop down so that the axle will engage in the recesses 23. The fingers 24 will, however, limit the downward movement of the latch plates and retain these plates in such position as to prevent accidental shifting movement of the axle rearwardly through the slots 11. The rod 22 constrains the free ends of the latch plates 20 to move in unison, and they may take the axle engaging position indicated in Fig. 1, in which the axle is restrained by the latches at the forward ends of the guide slots 11, or they may take the position indicated in Fig. 2, in which the lower edges of the plates rest upon the axle and the latter may move relatively to the body of the truck, and forwardly through the guide slots.

The operation of the truck may be briefly described as follows: In loading the truck, the parts being in the position indicated in Fig. 2, the operator placing his foot on the axle and grasping the handles of the truck, may draw the body rearwardly transversely of the axle, the latter being retained in a stationary position by his foot, until the latch members engaging the axle retain the same at the forward ends of the guide slots 11. The truck may now be readily manipulated to attain a position alongside the bundle or object to be loaded, and having been moved into the dotted line position indicated in Fig. 2, the toe or portion 5 of the plate 4—5 may be slipped beneath the adjacent edge of the object or article, and the latter tilted back onto the body. The operator may now release the latches by kicking them up out of engagement with the axle, and the truck may then be rocked backwardly upon the rockers or bracket plates 7, and at the same time the wheels carrying the axle, will roll easily backward, the axle gliding or sliding rearwardly through the guide slots 11 until it reaches the extreme rear ends of the same. As the rearward rocking movement of the truck continues, the weight, which previous to this time will have rested upon the rockers, will be transferred to the axle, as the rockers leave the floor, in a smooth and unbroken motion. The truck is now in position to be wheeled to the place of deposit of the package or article and the weight of the package together with that of the truck body will be so poised above the axle as to be approximately balanced thereon, so that the operator will be relieved of the strain of supporting any appreciable portion of the weight. The truck is thus extremely easy to manipulate and will be found to present advantages in facilitating transportation not obtained by other trucks of this general class.

In unloading a package the reverse of the operation described takes place, the result being that the package may be quickly and gently lowered and deposited upon the floor.

I claim:

1. A truck comprising a body having handles at one end, an axle provided with supporting wheels, guide plates secured to the opposite sides of the body at the opposite end, each having a curved passage arranged with its concavity upward, and the said passages being in register, the axle passing through the passages at its ends and the wheels being outside of the guide plates, each plate having an inwardly extending flange or rib encircling the guide passage through which the axle extends and the axle having its ends reduced and having a shoulder between each reduced portion and the body of the axle for engaging the rib, and latch mechanism for holding the axle at the ends of the passages remote from the handles.

2. A truck comprising a body having handles at one end, an axle provided with supporting wheels, guide plates secured to the opposite sides of the body at the opposite end, each having a curved passage arranged with its concavity upward, and the said passages being in register, the axle passing through the passages at its ends and the wheels being outside of the guide plates, and latch mechanism for holding the axle at the ends of the passages remote from the handles.

3. A truck including a body having handles at one end, rockers arranged on the other end of the body beneath the same, said rockers having alined curved guide slots provided therein, an axle extending transversely through the slots and being provided with supporting wheels, and a latch mechanism for holding the axle at the ends of the guide slots remote from the handles, said latch mechanism being operable for releasing the axle at will.

4. A truck including a body having handles at one end, rockers arranged at the other end of the truck beneath the same for initially receiving the weight of an article as it is loaded onto the truck, a transversely arranged axle movable longitudinally of the truck and carrying supporting wheels, said axle adapted to receive the weight as the rockers are lifted from the floor, and latch means for holding the axle at the end of its path of movement remote from the handles, said latch means being operable for releasing the axle at will.

5. A truck including a body having handles at one end, rockers provided adjacent to the opposite end of the truck beneath the same and adapted to initially receive the weight as an article is loaded onto the truck, and an axle provided with supporting wheels and movable longitudinally of the truck, and adapted to receive the weight as the rockers are lifted from the floor in tilting the truck into transporting position.

6. A truck including a body having handles at one end, rockers adjacent the opposite end of the truck beneath the same, an axle movable longitudinally of the truck body, guide means for directing and limiting the movement of the axle, supporting wheels carried by the axle, means whereby the axle may be retained at one end of its path of movement, said means being operable for releasing the axle at will.

JAMES T. HALL.